(12) United States Patent
Matsui et al.

(10) Patent No.: US 9,882,246 B2
(45) Date of Patent: Jan. 30, 2018

(54) ELECTROCHEMICAL ENERGY STORING DEVICE

(71) Applicants: PANASONIC CORPORATION, Osaka (JP); KYOTO UNIVERSITY, Kyoto (JP)

(72) Inventors: Toru Matsui, Osaka (JP); Toshiro Hirai, Tokyo (JP); Jun-ichi Yamaki, Kyoto (JP); Zempachi Ogumi, Kyoto (JP)

(73) Assignees: PANASONIC CORPORATION, Osaka (JP); KYOTO UNIVERSITY, Kyoto (JP)

( * ) Notice: Subject to any disclaimer, the term of this patent is extended or adjusted under 35 U.S.C. 154(b) by 146 days.

(21) Appl. No.: 14/720,706

(22) Filed: May 22, 2015

(65) Prior Publication Data
US 2015/0255830 A1 Sep. 10, 2015

Related U.S. Application Data

(63) Continuation of application No. PCT/JP2014/003359, filed on Jun. 23, 2014.

(30) Foreign Application Priority Data

Aug. 27, 2013 (JP) ................................. 2013-176000

(51) Int. Cl.
*H01M 10/052* (2010.01)
*H01M 10/0569* (2010.01)
(Continued)

(52) U.S. Cl.
CPC ........ *H01M 10/0569* (2013.01); *H01G 11/04* (2013.01); *H01G 11/22* (2013.01);
(Continued)

(58) Field of Classification Search
CPC ....................... H01M 10/052; H01M 10/0525
See application file for complete search history.

(56) References Cited

U.S. PATENT DOCUMENTS

2001/0012586 A1\* 8/2001 Hong .................. H01M 4/0445
429/223
2004/0094741 A1 5/2004 Sato et al.
(Continued)

FOREIGN PATENT DOCUMENTS

JP 57-061267 A 4/1982
JP 02-072565 A 3/1990
(Continued)

OTHER PUBLICATIONS

International Search Report issued in corresponding International Patent Application No. PCT/J2014/003359, dated Jul. 22, 2014; 4 pages with English translation.

*Primary Examiner* — Olatunji Godo
(74) *Attorney, Agent, or Firm* — McDermott Will & Emery LLP

(57) ABSTRACT

An electrochemical energy storing device disclosed herein includes a positive electrode containing a positive-electrode active material, a negative electrode, and a nonaqueous electrolyte solution which is in contact with the positive electrode and the negative electrode. The positive-electrode active material in a discharged state contains at least one selected from the group consisting of an alkali metal chloride, an alkaline-earth metal chloride, and a quaternary alkylammonium chloride. The nonaqueous electrolyte solution contains, as a solvent, an ionic liquid including cations having an alkoxyalkyl group as a component.

14 Claims, 7 Drawing Sheets

(51) Int. Cl.
*H01G 11/22* (2013.01)
*H01G 11/54* (2013.01)
*H01M 4/60* (2006.01)
*H01M 10/0568* (2010.01)
*H01G 11/04* (2013.01)
*H01M 4/58* (2010.01)
*H01M 4/583* (2010.01)
*H01M 4/36* (2006.01)
*H01M 6/16* (2006.01)
*H01M 4/02* (2006.01)
*H01M 4/62* (2006.01)

(52) U.S. Cl.
CPC ............ H01G 11/54 (2013.01); H01M 4/364 (2013.01); H01M 4/582 (2013.01); H01M 4/583 (2013.01); H01M 4/60 (2013.01); H01M 10/052 (2013.01); H01M 10/0568 (2013.01); *H01M 4/625* (2013.01); *H01M 6/16* (2013.01); *H01M 2004/028* (2013.01); *H01M 2300/0028* (2013.01); *H01M 2300/0045* (2013.01); *Y02E 60/13* (2013.01); *Y02T 10/7011* (2013.01)

(56) References Cited

U.S. PATENT DOCUMENTS

| | | |
|---|---|---|
| 2006/0034035 A1 | 2/2006 | Maruo et al. |
| 2008/0299447 A1 | 12/2008 | Fujiwara |
| 2009/0061315 A1* | 3/2009 | Nakano ............... H01M 4/0404 429/218.1 |
| 2009/0186271 A1* | 7/2009 | Wakita .................. H01M 4/13 429/213 |
| 2013/0089769 A1* | 4/2013 | Proctor .................. H01G 11/42 429/127 |

FOREIGN PATENT DOCUMENTS

| | | |
|---|---|---|
| JP | 2004-047416 A | 2/2004 |
| JP | 2004-111294 A | 4/2004 |
| JP | 2008-141160 A | 6/2008 |
| JP | 2009-9933 A | 1/2009 |
| JP | 2009-64584 A | 3/2009 |
| JP | 2012-055167 A | 3/2012 |
| JP | 2012-119653 A | 6/2012 |
| WO | WO2011137239 | * 11/2011 |

* cited by examiner

ELECTROCHEMICAL ENERGY STORING DEVICE

This is a continuation of International Application No. PCT/JP2014/003359, with an international filing date of Jun. 23, 2014, which claims priority of Japanese Patent Application No. 2013-176000, filed on Aug. 27, 2013, the contents of which are hereby incorporated by reference.

BACKGROUND

1. Technical Field

The present application relates to an electrochemical energy storing device.

2. Description of the Related Art

In recent years, smartphones, mobile phones, personal digital assistants, laptop computers, camcorders, portable game machines, and the like have gained performance enhancements or long-hour driving abilities, which require the electrochemical energy storing device mounted in any such device to have a higher energy density.

Electrochemical energy storing devices are categorized as electrical double layer capacitors, hybrid capacitors, or batteries.

An electrical double layer capacitor is a device that, by using a pair of polarizable electrodes, allows ions in an electrolyte solution to be adsorbed to both electrodes via charging, thereby forming an electrical double layer, as a result of which electric charge is stored. The current which flows in an electrical double layer capacitor is a non-faradic current. A battery is a device which stores electric charge by allowing oxidation and reduction reactions of an active material to occur at the positive electrode and the negative electrode, the oxidation and reduction reactions being proportionate to the amount of charge that has flowed. A current which flows in a battery is a faradic current. A hybrid capacitor is a device one electrode of which is a polarizable electrode and the other electrode of which is an electrode that causes redox reactions. A hybrid capacitor is also called an electrochemical capacitor.

A big difference between a capacitor/hybrid capacitor and a battery is the changes in ion concentration in the electrolyte solution upon charging and discharging of each device. In a capacitor or a hybrid capacitor, ions in the electrolyte solution are adsorbed to at least one of the electrodes via charging, whereby the ion concentration is reduced. In a battery, during charging or discharging, ions migrate from one electrode to the other electrode, and thus the ion concentration in the electrolyte solution does not change. Therefore, the energy density of a capacitor or a hybrid capacitor depends on the amount of electrolyte solution that is accommodated in the device, whereas a battery has no such dependency. In a battery, a reduced amount of electrolyte solution may be employed while increasing the amounts of positive electrode—and negative electrode—active materials, and thus its energy density can be greater than the energy density of a capacitor or a hybrid capacitor.

Patent Document 1 discloses a hybrid capacitor which oxidizes bromine ions ($Br^-$) or iodine ions ($I^-$) existing in the electrolyte solution to bromine ($Br_2$) or iodine ($I_2$) during charging to thereby store electric charge at the positive electrode, and during discharging reduces them back to the respective ions to thereby release electric charge. Carbon materials such as an activated carbon are used for the positive electrode, whereas ionic liquids such as 1-ethyl-3-methylimidazolium.tetrafluoroborate (abbreviated as $EMI.BF_4$) or organic solvents such as propylene carbonate (abbreviated as PC) are used as the solvent in the electrolyte solution. As the electrolyte salt, 1-ethyl-3-methylimidazolium bromide (abbreviated as EMI.Br), lithium bromide (LiBr), or the like is used, with a preferable concentration of 0.3 to 2.5 mols/L being recited. While potential of the redox reaction between $Br^-$ and $Br_2$ is measured with reference to a platinum needle in Japanese Laid-Open Patent Publication No. 2012-119653, their equilibrium potential can also be calculated by using a standard free energy of formation between $Br_2$ and lithium metal (Li), as in Formula (1).

$$3.5 \text{ V}: Br_2 + 2Li \Leftrightarrow 2LiBr \tag{1}$$

Japanese Laid-Open Patent Publication No. 2008-141160 discloses a thermally activated capacitor which incorporates an electrolyte that is solid at room temperature. One of them is described to be a capacitor whose electrolyte is an inorganic molten salt containing lithium chloride (LiCl), which is supposedly capable of charging and discharging at the melting point of the molten salt or higher.

Japanese Laid-Open Patent Publication No. 2008-141160 describes that use of an ionic liquid such as 1-ethyl-3-methylimidazolium chloride (abbreviated as EMI.Cl) also enables similar charging and discharging as a capacitor.

Japanese Laid-Open Patent Publication No. 2009-64584 proposes a nonaqueous electrolyte solution secondary battery whose positive electrode contains lithium iodide (LiI), lithium bromide (LiBr), or lithium chloride (LiCl), such that iodine ($I_2$), bromine ($Br_2$), or chlorine ($Cl_2$) is generated via charging and dissolved into the electrolyte solution. It discloses that, at the negative electrode, lithium metal (Li) may deposit or an alloy of Li and aluminum metal (Al) may form during charging, and $I_2$ or the like that is dissolved in the electrolyte solution becomes reduced at the positive electrode during discharging, so that lithium ions ($Li^+$) are released from the negative electrode.

SUMMARY

However, the aforementioned conventional techniques failed to provide an electrochemical energy storing device capable of better charging and discharging and having a high energy density. One non-limiting, and exemplary embodiment of the present application provides an electrochemical energy storing device capable of better charging and discharging and having a high energy density.

The electrochemical energy storing device disclosed herein includes a positive electrode containing a positive-electrode active material, a negative electrode, and a nonaqueous electrolyte solution which is in contact with the positive electrode and the negative electrode. In a discharged state, the positive-electrode active material contains at least one selected from the group consisting of an alkali metal chloride, an alkaline-earth metal chloride, and a quaternary alkylammonium chloride. The nonaqueous electrolyte solution contains, as a solvent, an ionic liquid including cations having an alkoxyalkyl group as a component.

In the electrochemical energy storing device disclosed herein, by using an alkali metal chloride, an alkaline-earth metal chloride, or a quaternary alkylammonium chloride as the positive-electrode active material in a discharged state, it is possible to suppress changes in the ion concentration of the alkali metal ions, alkaline-earth metal ions, or alkylammonium in the nonaqueous electrolyte solution. Moreover, by using a nonaqueous electrolyte solution which contains, as a solvent, an ionic liquid including cations having an alkoxyalkyl group as a component, it is possible to dissolve the alkali metal chloride, alkaline-earth metal chloride, or quaternary alkylammonium chloride in the nonaqueous electrolyte solution, thereby realizing an electrochemical energy storing device with a high energy density which has excellent charging/discharging reversibility.

These general and specific aspects may be implemented using a system, a method, and a combination of a system and a method.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1:
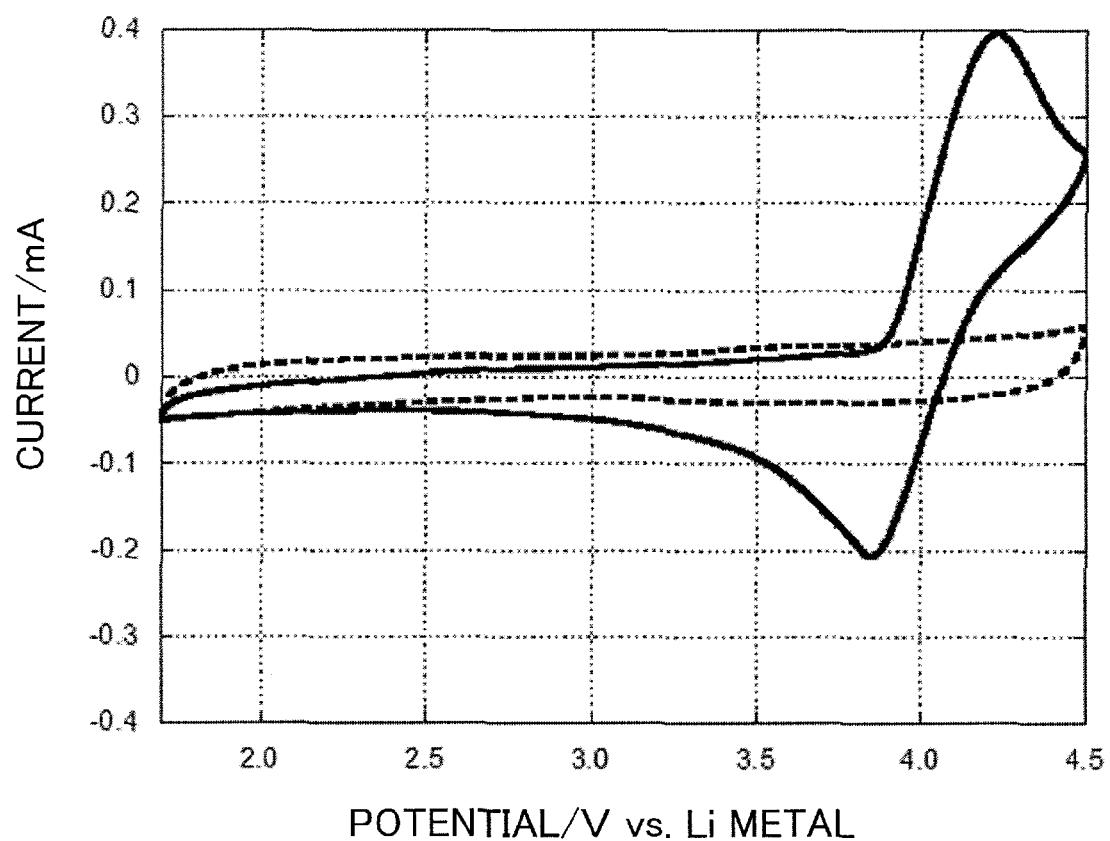
FIG. 1 is a diagram showing potential-current changes when a carbon electrode was subjected to cyclic voltammetry in an LiCl/DEME.BF$_4$ solution and in an LiBF$_4$/DEME.BF$_4$ solution.

The inventors have studied the secondary batteries and the like disclosed in Patent Documents 1 to 3 in detail. It was consequently found that the hybrid capacitor disclosed in Patent Document 1 consumes Br$^-$ and the like in the electrolyte solution during charging, which makes it difficult to further enhance its energy density.

By substituting the bromine ions (Br$^-$) used as the active material with chlorine ions (Cl$^-$), the energy density of the electrochemical energy storing device can presumably be enhanced, since the atomic weight of chlorine is smaller than that of bromine. An equilibrium potential between chlorine ions (Cl$^-$) and chlorine (Cl$_2$) can be calculated as indicated by Formula (2). Thus, by utilizing oxidation of Cl$^-$ and reduction of Cl$_2$, a potential which is higher than that indicated by Formula (1) can be obtained, i.e., the energy density of the device can be enhanced.

4.0 V: $Cl_2 + 2Li \Leftrightarrow 2LiCl$ (2)

However, when utilizing this reaction, it is necessary to dissolve lithium chloride (LiCl) at room temperature and prepare a nonaqueous electrolyte solution which is chlorine ion (Cl$^-$) conductive. The capacitor disclosed in Patent Document 2 uses an inorganic molten salt as an electrolyte, but Patent Document 2 lacks any description indicating a reaction where chlorine ions (Cl$^-$) in the molten salt are oxidized during charging to become chlorine (Cl$_2$) at the positive electrode and are reduced back to Cl$^-$. Although use of an ionic liquid such as 1-ethyl-3-methylimidazolium chloride (abbreviated as EMI.Cl) is disclosed, there is no description as to whether lithium chloride (LiCl) dissolves in EMI.Cl or not.

It is believed in the secondary battery disclosed in Patent Document 3 that, when Cl$_2$ is dissolved in the electrolyte solution and reaches the negative electrode, Cl$_2$ reacts with the lithium (Li) contained in the negative electrode, thus producing poorly-soluble lithium chloride (LiCl). Unless using an electrolyte solution which dissolves LiCl, it is believed that the negative electrode will be covered by LiCl, thus hindering the charge reaction; as a result, charge-discharge reactions will not progress. The electrolyte solution used in Patent Document 3 is lithium ion (Li$^+$) conductive, and therefore cannot dissolve poorly-soluble lithium chloride (LiCl), so that, presumably, charging and discharging will not actually take place as proposed.

In view of these problems, the inventors have reconsidered nonaqueous electrolyte solution compositions, thus arriving at a novel electrochemical energy storing device construction which enables a reaction at the positive electrode that corresponds to oxidation of chlorine ions (Cl$^-$) and reduction of chlorine (Cl$_2$), such that poorly-soluble lithium chloride (LiCl) or the like is unlikely to accumulate at the negative electrode.

An electrochemical energy storing device according to an embodiment of the present application comprises: a positive electrode containing a positive-electrode active material; a negative electrode; and a nonaqueous electrolyte solution which is in contact with the positive electrode and the negative electrode, wherein, in a discharged state, the positive-electrode active material contains at least one selected from the group consisting of an alkali metal chloride, an alkaline-earth metal chloride, and a quaternary alkylammonium chloride; and the nonaqueous electrolyte solution contains, as a solvent, an ionic liquid including cations having an alkoxyalkyl group as a component.

In a charged state, the positive electrode may have chlorine (Cl$_2$) adsorbed thereto, the Cl$_2$ having been generated from the alkali metal chloride, alkaline-earth metal chloride, or quaternary alkylammonium chloride.

The alkali metal chloride may be lithium chloride (LiCl).

The alkaline-earth metal chloride may be magnesium chloride (MgCl$_2$).

The quaternary alkylammonium chloride may be tetrabutylammonium chloride $((C_4H_9)_4NCl)$.

Cations in the ionic liquid may be diethylmethyl-2-methoxyethylammonium ions $((C_2H_5)_2(CH_3)(CH_3OCH_2CH_2)N^+)$.

Anions in the ionic liquid may be tetrafluoroborate ions $(BF_4^-)$.

Anions in the ionic liquid may be bis(trifluoromethanesulfonyl)imide ions $((CF_3SO_2)_2N^-)$.

The positive electrode may contain a carbon material, and, in the charged state, the chlorine may be adsorbed to the carbon material.

The carbon material may be acetylene black.

The carbon material may be activated carbon.

Hereinafter, embodiments of the electrochemical energy storing device according to the present invention will be described in detail. The term "electrochemical energy storing device" collectively refers to any device that is capable of repeatedly storing electric charge through charging and discharging, e.g., a secondary battery, a capacitor, or a hybrid capacitor, and a primary battery.

The electrochemical energy storing device of the present embodiment includes: a positive electrode containing a positive-electrode active material; a negative electrode; and a nonaqueous electrolyte solution being located between and in contact with the positive electrode and the negative electrode. In a discharged state, the positive-electrode active material contains at least one selected from the group consisting of an alkali metal chloride, an alkaline-earth metal chloride, and a quaternary alkylammonium chloride. Moreover, the nonaqueous electrolyte solution contains, as a solvent, an ionic liquid including cations having an alkoxyalkyl group as a component.

In a discharged state, with charging, the positive-electrode active material which is an alkali metal chloride, an alkaline-earth metal chloride, or a quaternary alkylammonium chloride has its chlorine ions ($Cl^-$) oxidized, and generates chlorine ($Cl_2$). On the other hand, with discharging, $Cl_2$ is reduced back to $Cl^-$. The solvent of the nonaqueous electrolyte solution is constituted by an ionic liquid including cations having an alkoxyalkyl group as a component. This ionic liquid well dissolves an alkali metal chloride, an alkaline-earth metal chloride, and a quaternary alkylammonium chloride. Therefore, the electrochemical energy storing device of the present embodiment has excellent charging/discharging reversibility, thus being able to smoothly repeat charging and discharging. Hereinafter, constituent elements of the present embodiment will be described in detail.

1. Constituent Elements of the Electrochemical Energy Storing Device (1) Nonaqueous Electrolyte Solution As a solvent, the nonaqueous electrolyte solution of the present embodiment contains an ionic liquid including cations having an alkoxyalkyl group as a component. As an electrolyte salt, the nonaqueous electrolyte solution may contain at least one of a halogenated alkali metal and a halogenated alkaline-earth metal dissolved in the ionic liquid.

As used herein, the ionic liquid is a salt composed of cations and anions, whose melting point is approximately 100° C. or less. It does not include any chloroaluminate-type molten salt in which anions are used, e.g., $AlCl_4^-$ or $Al_2Cl_7^-$. The ionic liquid is also referred to as an ion liquid or molten salt.

Examples of cations having an alkoxyalkyl group are quaternary ammonium ions. More specifically, examples of cations having an alkoxyalkyl group include: diethylmethyl-2-methoxyethylammonium ions $((C_2H_5)_2(CH_3)(CH_3OCH_2CH_2)N^+$, abbreviated as DEME), diethylmethyl-2-methoxypropylammonium ions $((C_2H_5)_2(CH_3)(CH_3OCH_2CH_2CH_2)N^+)$, ethyldimethyl-(2-methoxyethyl)ammonium ions $((C_2H_5)(CH_3)_2(CH_3OCH_2CH_2)N^+$, abbreviated as MOEDEA), and ethyldimethyl-(2-methoxypropyl)ammonium ions $((C_2H_5)(CH_3)_2(CH_3OCH_2CH_2CH_2)N^+)$. Cyclic quaternary ammonium ions may also be used. Examples of quaternary ammonium ions having a five-membered ring include: methyl-2-methoxyethylpyrrolidinium ions $((CH_3)(CH_3OCH_2CH_2)N^+(CH_2)_4)$, methyl-(2-methoxypropyl)pyrrolidinium ions $((CH_3)(CH_3OCH_2CH_2CH_2)N^+(CH_2)_4)$, ethyl-(2-methoxyethyl)pyrrolidinium ions $((C_2H_5)(CH_3OCH_2CH_2)N^+(CH_2)_4)$, and ethyl-(2-methoxypropyl)pyrrolidinium ions $((C_2H_5)(CH_3OCH_2CH_2CH_2)N^+(CH_2)_4)$. Instead of these five-membered ring ammonium ions, piperidinium ions having a six-membered ring may also be used. The ionic liquid contains at least one among these cations.

From the standpoint of allowing alkali metal chlorides and alkaline-earth metal chlorides to dissolve well, preferable among these quaternary ammonium ions are: diethylmethyl-2-methoxyethylammonium ions $((C_2H_5)_2 (CH_3)(CH_3OCH_2CH_2)N^+$, abbreviated as DEME), methyl-2-methoxyethylpyrrolidinium ions $((CH_3)(CH_3OCH_2CH_2)N^+(CH_2)_4)$ and methyl-2-methoxyethylpiperidinium ions $((CH_3)(CH_3OCH_2CH_2)N^+(CH_2)_5)$.

The cations having an alkoxyalkyl group may be phosphonium ions obtained by replacing the N atom(s) in the aforementioned quaternary ammonium ions with a P atom (s).

The anions in the ionic liquid used in the present embodiment are, for example, fluoro complex ions. Examples of fluoro complex ions include, in the case where boron is the nucleus: $BF_4^-$, $BF_x(CF_3)y^-$ (x+y=4, where x is not 4), $BF_x(C_2F_5)y^-$ (x+y=4, where x is not 4), $BF_x(C_3F_7)y^-$ (x+y=4, where x is not 4), and $BF_x(C_4F_9)y^-$ (x+y=4, where x is not 4). In these fluoro complex ions, one or more of the following may be replaced by one or more oxalate ions residues (O—C(=O)—C(=O)—O): two or more F's, two or more perfluoroalkyl groups, and a combination of one F and one perfluoroalkyl group. Among fluoro complex ions whose nucleus is boron, $BF_4^-$ is the most preferable because its formula weight is small and thus the electrolyte solution weight can be reduced.

The anions in the ionic liquid may be fluoro complex ions whose nucleus is phosphorus. Examples thereof include: $PF_6^-$, $PF_x(CF_3)y^-$ (x+y=6, where x is not 6), $PF_x(C_2F_5)y^-$ (x+y=6, where x is not 6; abbreviated as FAP when x=3), $PF_x(C_3F_7)y^-$ (x+y=6, where x is not 6), and $PF_x(C_4F_9)y^-$ (x+y=6, where x is not 6). In these fluoro complex ions, one or more of the following may be replaced by one or more oxalate ions residues (O—C(=O)—C(=O)—O): two or more F's, two or more perfluoroalkyl groups, and a combination of one F and one perfluoroalkyl group. Among fluoro complex ions whose nucleus is phosphorus, $PF_3(C_2F_5)_3^-$ is the most preferable.

Other than boron and phosphorus as mentioned above, the nucleus of the fluoro complex ions may be arsenic, antimony, or the like.

Moreover, the anions in the ionic liquid may be imide ions. Examples of acyclic imide ions include: $(FSO_2)_2N^-$, $(FSO_2)(CF_3SO_2)N^-$, $(CF_3SO_2)_2N^-$ (abbreviated as TFSI$^-$), $(C_2F_5SO_2)_2N^-$, $(CF_3SO_2)(C_4F_9SO_2)$ $N^-$, and $(CF_3SO_2)(CF_3CO)N^-$. Examples of cyclic imide ions include: $(CF_2SO_2)_2N^-$ (which form a five-membered ring) and $CF_2(CF_2SO_2)_2N^-$ (which form a six-membered ring). Among imide ions, $(CF_3SO_2)_2N^-$ (abbreviated as TFSI$^-$) is the most preferable.

Moreover, methide ions such as $(CF_3SO_2)_3C^-$ may also be used.

Alkylphosphate ions can also be used as the anions in the ionic liquid. Examples thereof include $(CH_3O)_2PO_2^-$, $(C_2H_5O)_2PO_2^-$ and $(CH_3O)(C_2H_5O)PO_2^-$. Herein, some or all H's in the alkyl group may be substituted by F's.

Other examples of anions include: inorganic ions such as $CN^-$, $NO_3^-$, $ClO_4^-$, $SO_3^{2-}$, $SO_4^{2-}$, $S_2O_3^{2-}$, $SCN^-$, $CO_3^{2-}$, and $PO_4^{3-}$; and organic ions such as $CH_3CO_2^-$, $C_2H_5CO_2^-$, $C_6H_5CO_2^-$ (benzoate ions), $^-OOC$—$COO^-$ (oxalate ions), and $C_6H_4(CO_2)^{2-}$ (phthalate ions: ortho-, meta-, and para-). Some or all H's in the organic ions may be substituted by F's. Sulfonate ions such as $CF_3SO_3^-$, $C_2F_5SO_3^-$, $C_3F_7SO_3^-$, and $C_4F_9SO_3^-$ may also be used.

Some combinations of the aforementioned cations and anions may be solid at room temperature. In such cases, the nonaqueous electrolyte solution may further contain an organic solvent. However, as the organic solvent increases, the chlorine ($Cl_2$) generated at the positive electrode will become more likely to dissolve into the electrolyte solution. Therefore, in the case where the nonaqueous electrolyte solution contains an organic solvent, the organic solvent content is approximately equimolar to the ionic liquid or less.

Examples of the organic solvent include the following.

Examples of cyclic carbonates are propylene carbonate (PC), ethylene carbonate (EC), butylene carbonate (BC), vinylene carbonate (VC), vinylethylene carbonate (VEC), and fluoroethylene carbonate (FEC).

Examples of cyclic esters are γ-butyrolactone (GBL), α-methyl-γ-butyrolactone (MGBL), γ-valerolactone (GVL), furanone (FL), 3-methyl-2(5H)-furanone (MFL), and α-angelicalactone (AGL).

Examples of chain carbonates are dimethyl carbonate (DMC), ethyl methyl carbonate (EMC), diethyl carbonate (DEC), methylpropyl carbonate (MPuC), methylbutyl carbonate (MBC), and methylpentyl carbonate (MPeC).

Examples of cyclic ethers are tetrahydrofuran (THF), 2-methyl tetrahydrofuran (MTHF), 2,5-dimethyl tetrahydrofuran (dMTHF), 1,3-dioxolane (DIOX), 2-methyl-1,3-dioxolane (MDIOX), tetrahydropyran (THP), and 2-methyl-tetrahydropyran (MTHP).

Examples of acyclic ethers are diethyl ether (DEEt), methylbutyl ether (MBE), 1,2-dimethoxyethane (DME), 1-methoxy-2-ethoxy ethane (EME), and 1,2-diethoxy ethane (DEE). Moreover, diglyme, triglyme, and tetraglyme may also be used. Polyethylene glycol, both of whose ends are aprotic, is also preferable.

Examples of nitriles are acetonitrile (AN), propionitrile (PN), and adiponitrile (AGN).

Examples of organic solvents containing a nitrogen or sulfur element include N-methylpyrrolidone (NMP), and dimethyl sulfoxide (DMSO).

Among the above solvents, it is preferable to use cyclic carbonates, chain carbonates, cyclic ethers, or acyclic ethers.

These solvents may each be used alone, or a plurality of them may be used in mixture.

The electrolyte salt to be dissolved in the ionic liquid may be a salt of the anions mentioned above for the ionic liquid and an alkali metal ion or an alkaline-earth metal ion. Preferably, it is an alkali metal chloride or an alkaline-earth metal chloride. In particular, lithium chloride (LiCl) and magnesium chloride ($MgCl_2$) are preferable because alkali metal ions or alkaline-earth metal ions will function also as charge transfer ions. LiCl and $MgCl_2$ may each be used alone or they may be used in mixture. Using LiCl and $MgCl_2$ in mixture will tend to provide an increased solubility into the ionic liquid.

In the case where the positive-electrode active material in a discharged state is an alkali metal chloride, the nonaqueous electrolyte solution is preferably alkali metal ion conductive. This can be realized by dissolving a solute having alkali metal ions as a component into a nonaqueous solvent.

Examples of solutes having lithium ions ($Li^+$) as a component are electrolyte salts which are used in lithium-ion batteries, e.g., lithium tetrafluoroborate ($LiBF_4$), lithium hexafluorophosphate ($LiPF_6$), lithium perchlorate ($LiClO_4$), lithium trifluoromethylsulfonate ($CF_3SO_3Li$), lithium bis (trifluoromethanesulfonyl)imide (($CF_3SO_2)_2NLi$) lithium tris(pentafluoroethyl)trifluorophosphate ($LiP(C_2F_5)_3F_3$) and lithium bis(oxalate)borate (($O-C(=O)-C(=O)-O)_2$BLi).

Although the solubility will decrease, solutes having sodium ions ($Na^+$), potassium ions ($K^+$), cesium ions ($Cs^+$), or rubidium ions ($Rb^+$) as a component will also allow their anions to be used, similarly to solutes having $Li^+$ as a component.

In the case where the positive-electrode active material in a discharged state is an alkaline-earth metal chloride, the nonaqueous electrolyte solution is preferably alkaline-earth metal ion conductive. As the anions in a solute having $Mg^{2+}$, $Ca^{2+}$, $Sr^{2+}$, or $Ba^{2+}$ as a component, their own anions can be used, similarly to solutes having $Li^+$ as a component.

In the case where the positive-electrode active material in a discharged state is a quaternary alkylammonium chloride, the nonaqueous electrolyte solution is preferably ammonium ion conductive. Examples of quaternary alkylammonium ions include: tetramethylammonium ions (($CH_3)_4N^+$), tetraethylammonium ions (($C_2H_5)_4N^+$), tetrapropylammonium ions (($C_3H_7)_4N^+$), tetrabutylammonium ions (($C_4H_9)_4N^+$), tetraoctylammonium ions (($C_8H_{17})_4N^+$)triethylmethylammonium ions (($C_2H_5)_3(CH_3)N^+$), tributylmethylammonium ions (($C_4H_9)_3(CH_3)N^+$), trioctylmethylammonium ions (($C_8H_{17})_3(CH_3)N^+$), triemethylpropylammonium ions (($CH_3)_3(C_3H_7)N^+$), diethyldimethylammonium ions (($C_2H_5)_2(CH_3)_2N^+$), diethylmethyl-(2-methoxyethyl)ammonium ions (($C_2H_5)_2(CH_3)(CH_3OCH_2CH_2)N^+$), ethyldimethyl-(2-methoxyethyl)ammonium ions (($C_2H_5)(CH_3)_2(CH_3OCH_2CH_2)N^+$), spiro-(1,1)bipyrrolidinium ions (($C_4H_8)_2N^+$), butylmethylpyrrolidinium ions (($C_4H_9)(CH_3)(C_4H_8)N^+$), and propylmethylpiperidinium ions (($C_3H_7)(CH_3)(C_5H_{10})N^+$). As the anions to form a solute together with these ions, their own anions can be used, similarly to solutes having $Li^+$ as a component. The quaternary alkylammonium ions composing the positive-electrode active material in a discharged state and the quaternary alkylammonium ions in the nonaqueous electrolyte solution may be identical or different.

In the case where the cations in the ionic liquid are diethylmethyl-2-methoxyethylammonium ions (($C_2H_5)_2(CH_3)(CH_3OCH_2CH_2)N^+$, abbreviated as DEME), and the anions are tetrafluoroborate ions ($BF_4^-$), LiCl or $MgCl_2$, which has been difficult to dissolve in an organic solvent, will have a remarkably increased solubility. For example, the solubility of $MgCl_2$ with respect to tetrahydrofuran (abbreviated as THF) is not more than $MgCl_2/THF=1/20$ in molar ratio. On the other hand, the solubility of $MgCl_2$ with respect to $DEME.BF_4$ is at least $MgCl_2/DEME.BF_4=5/20$ in molar ratio.

(2) Positive Electrode

The positive electrode contains a positive-electrode active material. The positive-electrode active material in a discharged state is an alkali metal chloride, e.g., lithium chloride (LiCl), sodium chloride (NaCl), potassium chloride (KCl), rubidium chloride (RbCl), or cesium chloride (CsCl). Moreover, an alkaline-earth metal chloride may also be used, e.g., magnesium chloride ($MgCl_2$), calcium chloride ($CaCl_2$), strontium chloride ($SrCl_2$), or barium chloride ($BaCl_2$). Among these, LiCl and $MgCl_2$ are preferable substances because their formula weights are the smallest, thus increasing the energy density of the electrochemical energy storing device. Furthermore, chlorides of a quaternary alkylammonium ion and a chlorine ion ($Cl^-$) may also be used.

The positive electrode further contains a carbon material in order to adsorb the chlorine that is generated from an alkali metal chloride, an alkaline-earth metal chloride, and a quaternary alkylammonium chloride in a charged state.

As the carbon material, carbon blacks can be used, for example. A carbon black is a carbon material in which 10 to 100 nm particles are clustered in the shape of a chain or a bunch of grapes. A carbon black facilitates the $Cl_2$ generating reaction because of its excellent electrical conductivity, and stably captures the generated $Cl_2$ because of its high specific surface area. Carbon blacks are categorized as furnace black (Ketjen black) which is produced through incomplete combustion of petroleum or natural gas, channel black, acetylene black which is produced through pyrolysis of acetylene or natural gas, thermal black, or the like. A carbon black also has a substantial property of absorbing and retaining a nonaqueous electrolyte solution, and therefore makes it easy for alkali metal ions occurring through charging to be released from the positive electrode.

Other carbon materials can also be used for the positive electrode. Fullerenes such as $C_{60}$, $C_{70}$, and $C_{76}$, single-layer or multilayer carbon nanotubes, graphene, and the like have excellent electrical conductivity, and therefore facilitate chlorine ($Cl_2$) generation. A fullerene polymer resulting from polymerization of $C_{60}$ or the like may also be used. As carbon materials with excellent electrical conductivity, natural graphite or artificial graphite can also be used, or microspheres of these may be used.

Activated carbons and mesoporous carbons have a high specific surface area, and thus allow for stable $Cl_2$ retention. Natural plant-type activated carbons such as coconut shell, synthetic resin-type activated carbons such as phenol, and fossil fuel-type activated carbons such as coke can be used. Moreover, an ultrafine activated carbon powder which is produced by activating a carbon black can also be used.

Carbon fibers will improve the mechanical strength of the positive electrode, and suppress shape deterioration of the positive electrode due to repeated charging and discharging. PAN-type carbon fibers, mesophase pitch-type carbon fibers, vapor phase grown carbon fibers, and the like may also be used.

Powder of the alkali metal chloride and powder of the carbon material mentioned above may compose a positive electrode mixture or a positive-electrode active material layer. In this case, a positive electrode mixture or a positive-electrode active material layer can be produced by mixing the alkali metal chloride powder or carbon material powder together with a binder agent such as polyvinylidene fluoride. These powders may be straightforwardly subjected to powder mixing and then shaped, or may be dispersed or dissolved in a solvent such as N-methyl-2-pyrrolidone (abbreviated as NMP). A current collector may be bonded to the positive electrode mixture or positive-electrode active material layer, thus constructing a positive electrode which includes the positive electrode mixture or positive-electrode active material layer and the current collector. As the current collector, a graphene sheet, a graphite sheet, molybdenum, tungsten, platinum mesh, or the like can be used.

(3) Negative Electrode

The negative-electrode active material will depend on the migrating ions in the nonaqueous electrolyte solution, as follows.

In the case where alkali metal ions are the migrating ions in the nonaqueous electrolyte solution, the negative-electrode active material in a charged state is an alkali metal, an alloy containing an alkali metal, or an oxide containing an alkali metal. For example, it may be lithium metal (Li), or an Li-containing alloy combination such as Li—Ag, Li—Au, Li—Al, Li—Ga, Li—In, Li—Si, Li—Ge, Li—Sn, Li—Pb, or Li—Bi. An oxide containing lithium may be e.g. Li—$SnO_x$ or Li—$SiO_x$ (0<x≤2 in either case), or Li—CoO, Li—NiO, or the like. It is desirable that these oxides are miniaturized down to nanoscale. Alternatively, the oxide containing lithium may be $Li_5Ti_4O_{12}$.

In the case where alkaline-earth metal ions are the migrating ions in the nonaqueous electrolyte solution, the negative-electrode active material in a charged state is an alkaline-earth metal, or an alloy containing an alkaline-earth metal. For example, it may be magnesium metal (Mg), or an alloy containing Mg: a combination such as Mg—Co, Mg—Ni, Mg—Cu, Mg—Ag, Mg—Au, Mg—Al, Mg—Ga, Mg—In, Mg—Si, Mg—Ge, Mg—Sn, Mg—Pb, or Mg—Bi.

In the case where quaternary ammonium ions are the migrating ions in the nonaqueous electrolyte solution, a carbon material having a graphite structure is used as the negative electrode in a discharged state, for example. During charging of the electrochemical energy storing device, quaternary ammonium ions will intrude in between graphite layers. Moreover, an activated carbon which is used for an electrical double layer capacitor may be used. During charging, quaternary ammonium ions adsorb to the activated carbon. When an activated carbon is used for the negative electrode, the electrochemical energy storing device of the present embodiment is identical in construction to a conventional hybrid capacitor. However, the concentration of quaternary ammonium ions in the electrolyte solution does not change during charging or discharging, which is a distinct characteristic over conventional hybrid capacitors.

As the negative electrode material, a carbon material having a graphite structure or an activated carbon having an electrical double layer capacitance can also be used together with an electrolyte solution which is alkali metal ion conductive or alkaline-earth metal ion conductive.

(4) Separator

So long as the positive electrode and the negative electrode remain electrically insulated and the nonaqueous electrolyte solution remains in contact with the positive electrode and the negative electrode, the electrochemical energy storing device of the present embodiment is capable of charging and discharging. In practice, in order to realize an electrochemical energy storing device in a stable configuration, the electrochemical energy storing device may further include a separator, which is generally used for secondary batteries and the like. A separator is a resin layer that is composed of a resin not having electron conductivity, and is a microporous film having large ion transmission, predetermined mechanical strength, and electrical insulation. Preferably, a separator is composed of a material which is resistant against the aforementioned nonaqueous electrolyte solution, and is generally used in lithium secondary batteries, for example. A polyolefin resin of polypropylene or polyethylene alone, or a combination thereof, can be used.

(5) Construction of the Entire Electrochemical Energy Storing Device

Figure 7:
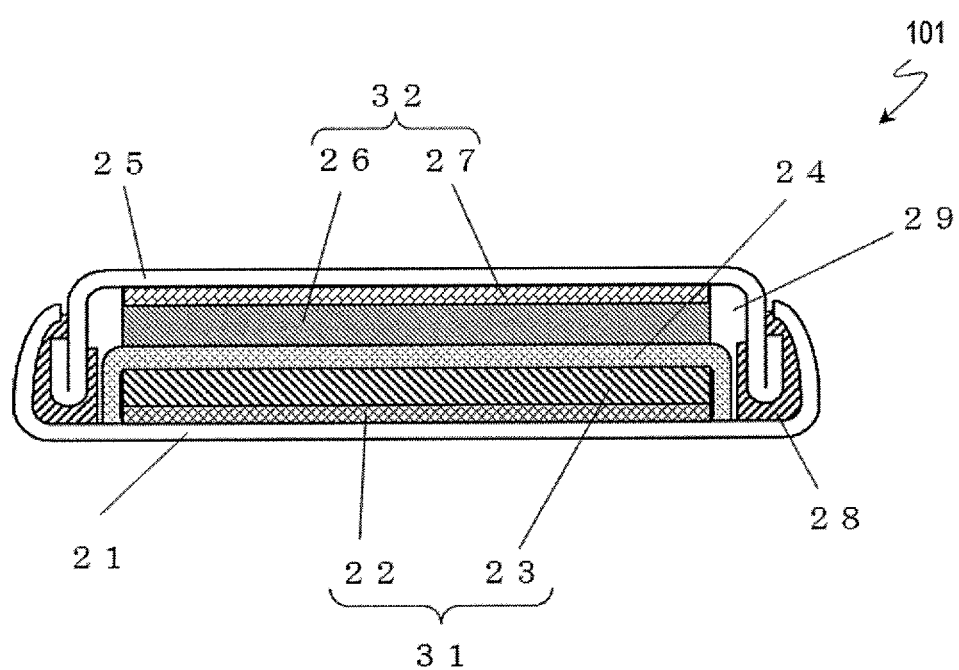
FIG. 7 is a cross-sectional view showing one embodiment of a coin-type nonaqueous electrolyte solution secondary battery.

An instance of constructing a secondary battery as the electrochemical energy storing device will be described. FIG. 7 is a cross-sectional view showing an exemplary coin-shaped secondary battery 101 as the electrochemical energy storing device. The coin-shaped secondary battery 101 shown in FIG. 7 includes a positive electrode 31, a negative electrode 32, and a separator 24. The positive electrode 31 includes a positive-electrode active material layer 23, and a positive-electrode current collector 22 which is in contact with the positive-electrode active material layer 23. The negative electrode 32 includes a negative-electrode active material layer 26, and a negative-electrode current collector 27 which is in contact with the negative-electrode active material layer 26. The positive-electrode active material layer 23 contains the aforementioned metal chloride.

The positive electrode 31 and the negative electrode 32 are arranged so that the positive-electrode active material layer 23 and the negative-electrode active material layer 26 oppose each other via the separator 24, while maintaining contact with the separator 24, thus composing an electrode group.

The electrode group is accommodated in the internal space of the case 21. The aforementioned nonaqueous electrolyte solution 29 is injected in the internal space of the case 21, so that the positive electrode 31, the negative electrode 32, and the separator 24 are immersed in the nonaqueous electrolyte solution 29. Since the separator 24 includes minute spaces for retaining the nonaqueous electrolyte solution 29, the nonaqueous electrolyte solution 29 is retained in the minute spaces, whereby the nonaqueous electrolyte solution 29 is interposed between the positive electrode 31 and the negative electrode 32. The opening of the case 21 is sealed by a sealing plate 25, using a gasket 28.

Although FIG. 7 illustrates a coin-type secondary battery, the electrochemical energy storing device of the present embodiment may have other shapes. For example, it may have a cylindrical shape or a rectangular shape. It may also be shaped large enough for use in electric vehicles or the like.

2. Electrode Reactions in the Electrochemical Energy Storing Device

Next, a charge reaction in a nonaqueous electrolyte solution secondary battery and a hybrid capacitor, as examples of the electrochemical energy storing device of the present embodiment, will be described. A discharge reaction is a reaction in which the charge reaction described below progresses in the opposite direction (from the right-hand side to the left-hand side), and can be similarly explained, although not specifically described below.

(1) A Secondary Battery Whose Positive-Electrode Active Material is Lithium Chloride A case where lithium chloride (LiCl), which is an alkali metal chloride, is used as the positive-electrode active material will be illustrated as an example in the following. A positive electrode in a discharged state is produced by mixing LiCl and an electrically conductive substance. When charging is started by flowing an oxidation current in the nonaqueous electrolyte solution, the chlorine ions ($Cl^-$) composing LiCl are oxidized at the positive electrode according to Formula (3) to become chlorine ($Cl_2$).

$$2LiCl \rightarrow Cl_2 + 2Li^+ + 2e \quad (3)$$

The lithium ions ($Li^+$) generated at the positive electrode are released into the nonaqueous electrolyte solution, and reduced to lithium metal (Li) at the negative electrode, according to Formula (4).

$$2Li^+ + 2e \rightarrow 2Li \quad (4)$$

Formula (3) and Formula (4), taken together, give Formula (5), which is identical to the leftward reaction in Formula (2).

$$2LiCl \rightarrow Cl_2 + 2Li \quad (5)$$

In Formula (5), $Li^+$ that was contained in Formula (3) and Formula (4) is cancelled out. This means that the ion concentration in the nonaqueous electrolyte solution does not change in this reaction. Therefore, if the nonaqueous electrolyte solution to be used in the electrochemical energy storing device of the present embodiment is $Li^+$ conductive, irrespective of the charged or discharged state, the ion concentration in the nonaqueous electrolyte solution will be theoretically constant. As a result, decrease in the charge-discharge reaction rate can be suppressed at least with respect to changes in the ion concentration in the nonaqueous electrolyte solution.

Now, if the reaction of Formula (5) is continued, the chlorine ($Cl_2$) generated at the positive electrode will dissolve into the electrolyte solution, eventually reaching the negative electrode to react with lithium (Li). As a result of this, according to Formula (6), lithium chloride (LiCl) is generated at the negative electrode.

$$Cl_2 + 2Li \rightarrow 2LiCl \quad (6)$$

However, since the nonaqueous electrolyte solution used in the present embodiment dissolves LiCl, a reaction of Formula (7) occurs, thereby restraining the LiCl from covering the negative electrode surface.

$$2LiCl \rightarrow 2Li^+ + 2Cl^- \quad (7)$$

The $Li^+$ and $Cl^-$ occurring due to dissociation of LiCl are reduced at the negative electrode according to Formula (8), and oxidized at the positive electrode according to Formula (9), respectively, thereby returning to Li and $Cl_2$.

$$2Li^+ + 2e \rightarrow 2Li \quad (8)$$

$$2Cl^- \rightarrow Cl_2 + 2e \quad (9)$$

When Formula (6) to Formula (9) are taken together, the left-hand side and the right-hand side are cancelled out. That is, even if chlorine ($Cl_2$) is reduced at the negative electrode to generate lithium chloride (LiCl), chlorine ions ($Cl^-$) that have been generated through dissociation are oxidized back to $Cl_2$ at the positive electrode, and lithium ions ($Li^+$) are reduced back to lithium (Li) at the negative electrode. Therefore, in the electrochemical energy storing device of the present embodiment, LiCl will not cover the negative electrode surface to hinder the reaction, and overcharged states are prevented.

(2) A Secondary Battery Whose Positive-Electrode Active Material is Magnesium Chloride In the case where the positive-electrode active material is magnesium chloride, the positive electrode, negative electrode, and overall reactions are as follows.

$$(\text{positive electrode}) \quad MgCl_2 \rightarrow Cl_2 + Mg^{2+} + 2e \quad (10)$$

$$(\text{negative electrode}) \quad Mg^{2+} + 2e \rightarrow Mg \quad (11)$$

$$(\text{overall}) \quad MgCl_2 \rightarrow Cl_2 + Mg \quad (12)$$

In this case, too, since the nonaqueous electrolyte solution has $Mg^{2+}$ ion conductivity, irrespective of the charged or discharged state, the ion concentration in the nonaqueous electrolyte solution is theoretically constant. As a result, decrease in the charge-discharge reaction rate can be suppressed at least with respect to changes in the ion concentration in the nonaqueous electrolyte solution.

(3) A Hybrid Capacitor Whose Positive-Electrode Active Material is Magnesium Chloride In the case where the positive-electrode active material is magnesium chloride, and a carbon material is used for the negative electrode, the electrochemical energy storing device is a hybrid capacitor. The positive electrode, negative electrode, and overall reactions are as follows.

$$(\text{positive electrode}) \quad MgCl_2 \rightarrow Cl_2 + Mg^{2+} + 2e \quad (13)$$

$$(\text{negative electrode}) \quad (1/\delta)C + Mg^{2+} + 2e \rightarrow (1/\delta)C^{2\delta-}(Mg^{2+})_\delta \quad (14)$$

$$(\text{overall}) \quad MgCl_2 + (1/\delta)C \rightarrow Cl_2 + (1/\delta)C^{2\delta-}(Mg^{2+})_\delta \quad (15)$$

In this case, too, since the nonaqueous electrolyte solution has $Mg^{2+}$ ion conductivity, irrespective of the charged or discharged state, the ion concentration in the nonaqueous electrolyte solution is theoretically constant. As a result, decrease in the charge-discharge reaction rate can be suppressed at least with respect to changes in the ion concentration in the nonaqueous electrolyte solution.

(4) A Hybrid Capacitor Whose Positive-Electrode Active Material is Tetrabutylammonium Chloride In the case where the positive-electrode active material is tetrabutylammonium chloride ($(C_4H_9)_4NCl$, abbreviated as $Bu_4NCl$ in the following formula), and a carbon material is used for the negative electrode, the electrochemical energy storing device is a hybrid capacitor. The positive electrode, negative electrode, and overall reactions are as follows.

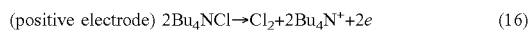

(positive electrode) $2Bu_4NCl \rightarrow Cl_2 + 2Bu_4N^+ + 2e$ (16)

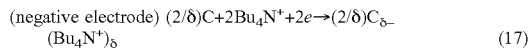

(negative electrode) $(2/\delta)C + 2Bu_4N^+ + 2e \rightarrow (2/\delta)C_{\delta-}(Bu_4N^+)_\delta$ (17)

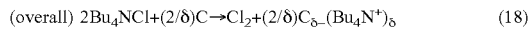

(overall) $2Bu_4NCl + (2/\delta)C \rightarrow Cl_2 + (2/\delta)C_{\delta-}(Bu_4N^+)_\delta$ (18)

In this case, by using the nonaqueous electrolyte solution $DEME \cdot BF_4$, the $Bu_4N^+$ in Formula (17) can also become $DEME^+$. Irrespective of which quaternary ammonium ion is involved in electric storage, the quaternary ammonium ion concentration in the nonaqueous electrolyte solution is theoretically constant, irrespective of the charged or discharged state. As a result, decrease in the charge-discharge reaction rate can be suppressed at least with respect to changes in the ion concentration in the nonaqueous electrolyte solution.

Thus, in the electrochemical energy storing device of the present embodiment, by using an alkali metal chloride, an alkaline-earth metal chloride, or a quaternary alkylammonium chloride as the positive-electrode active material in a discharged state, the ion concentration of alkali metal ions, alkaline-earth metal ions, alkylammonium in the nonaqueous electrolyte solution can be kept theoretically constant irrespective of the charged or discharged state. As a result, a nonaqueous electrolyte solution secondary battery having a high energy density that cannot be attained by a capacitor or a hybrid capacitor can be obtained. Moreover, by using a nonaqueous solvent which contains, as a solvent, an ionic liquid including cations having an alkoxyalkyl group as a component, the nonaqueous electrolyte solution well dissolves the alkali metal chloride, alkaline-earth metal chloride, or quaternary alkylammonium chloride. Therefore, the lithium chloride (LiCl) generated at the negative electrode can be dissociated, and its reoxidation into chlorine can be promoted, thus realizing an electrochemical energy storing device with a high energy density which has excellent charging/discharging reversibility.

EXAMPLES

Hereinafter, the embodiment of the present invention will be described more specifically with respect to Examples. Note that all experiments were conducted at room temperature, in a glove box with an argon ambient.

Example 1

By using two kinds of nonaqueous electrolyte solutions, the fact that there occurs oxidation of chlorine ions ($Cl^-$) and reduction into its oxidized form, chlorine ($Cl_2$), as well as the potential thereof, was confirmed.

By using an ionic liquid as a solvent in which to dissolve lithium chloride (LiCl, manufactured by Aldrich), an electrolyte solution was prepared. Diethylmethyl-2-methoxyethylammonium·tetrafluoroborate ($(C_2H_5)_2(CH_3)(CH_3OCH_2CH_2)N \cdot BF_4$, manufactured by Kanto chemical co., inc., abbreviated as $DEME \cdot BF_4$) was chosen. LiCl and $DEME \cdot BF_4$ were mixed to a molar ratio of $LiCl/DEME \cdot BF_4 = 1/10$, and agitated for 24 hours, whereby LiCl all dissolved to result in a transparent liquid.

A working electrode was produced by mixing and kneading acetylene black (manufactured by DENKI KAGAKU KOGYO KABUSHIKI KAISHA, abbreviated as AB) and polytetrafluoroethylene (manufactured by DAIKIN INDUSTRIES, ltd., abbreviated as PTFE) at a weight ratio of AB/PTFE=60/40, followed by rolling, which was thereafter made into a strip with a width of 5 mm.

The reference electrode and the counter electrode were both produced by using a nickel mesh (manufactured by The Nilaco Corporation) as a current collector, and attaching a lithium foil (manufactured by Honjo Metal Co., Ltd.) thereto.

The three electrodes were immersed in a $LiCl/DEME \cdot BF_4 = 1/10$ solution, and subjected to cyclic voltammetry. The measurement conditions were: a sweep rate of 1 mV/sec; a sweep range of 1.7 to 4.2 V; and 4 cycles.

Next, a nonaqueous electrolyte solution not containing $Cl^-$ was prepared. Lithium tetrafluoroborate ($LiBF_4$, manufactured by Kishida Chemical Col., Ltd.) and $DEME \cdot BF_4$ were mixed to a molar ratio of $LiBF_4/DEME \cdot BF_4 = 1/10$, and agitated for 24 hours, whereby $LiBF_4$ all dissolved to result in a transparent liquid.

In a similar manner to the above, a working electrode, a reference electrode, and a counter electrode were produced, and immersed in an $LiBF_4/DEME \cdot BF_4 = 1/10$ solution and subjected to cyclic voltammetry.

FIG. 1 shows the waveform of the 4th cycle of a cyclic voltammetry performed for each of the two electrolyte solutions. In FIG. 1, the solid line represents the case where $Cl^-$ is contained in the solution, whereas the broken line represents the case where no $Cl^-$ is contained in the solution. When $Cl^-$ is contained in the solution, an oxidation wave and a reduction wave emerge, which are centered around 4 V. This potential is equal to the potential given by Formula (2'), which makes it clear that oxidation of $Cl^-$ and reduction of the generated $Cl_2$ are occurring on the working electrode.

4.0 V: $Cl_2 + 2Li \Leftrightarrow 2LiCl$ (2')

Example 2

A positive electrode containing lithium chloride (LiCl) was produced. It was confirmed that oxidation and reduction of $Cl^-$ would occur in an electrolyte solution in which no chlorine ions ($Cl^-$) were dissolved.

LiCl, acetylene black (abbreviated as AB), and polytetrafluoroethylene (abbreviated as PTFE) were mixed to a weight ratio of LiCl/AB/PTFE=50/40/10 and kneaded, followed by rolling, whereby a positive electrode sheet was obtained. A disk with a diameter of 2 mm was punched out of this positive electrode sheet, which was press-fitted on a platinum mesh with 100 meshes (manufactured by The Nilaco Corporation), thereby producing a positive electrode.

A reference electrode and a counter electrode were both produced by using a nickel mesh as a current collector, and attaching a lithium foil thereto.

The nonaqueous electrolyte solution was prepared by mixing lithium tetrafluoroborate ($LiBF_4$) and diethylmethyl-2-methoxyethylammonium·tetrafluoroborate (abbreviated as $DEME \cdot BF_4$) to a molar ratio of $LiBF_4/DEME \cdot BF_4 = 1/10$, followed by agitation.

The three electrodes were immersed in a $LiBF_4/DEME \cdot BF_4 = 1/10$ solution, and a constant current was flowed in the working electrode to repeat charging and discharging.

The measurement conditions were that an oxidation current of 5 μA be flowed for 5 hours, followed by a reduction current of 5 μA, until the working electrode potential reached 3.0 V.

Figure 2:
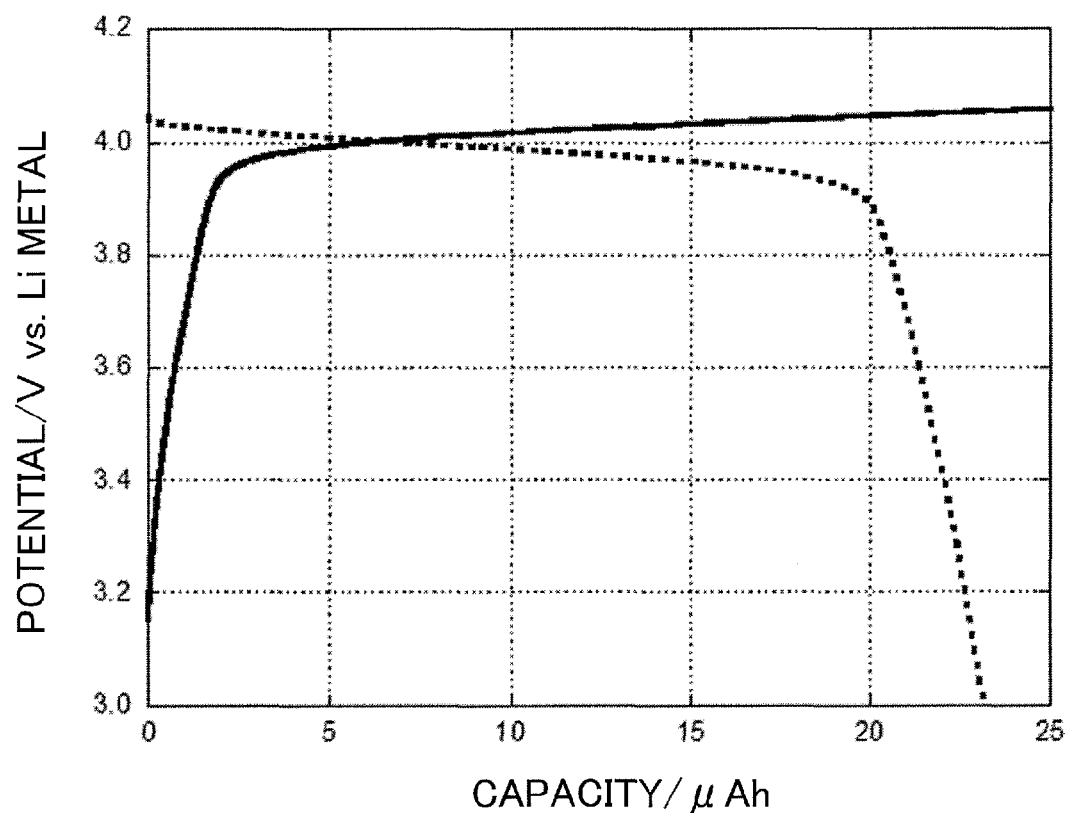
FIG. 2 is a diagram showing capacity-potential changes when an electrode containing LiCl was subjected to constant-current charging and discharging in an LiBF$_4$/DEME.BF$_4$ solution.

FIG. 2 shows charging and discharge curves in the 10th cycle. In each curve of FIG. 2, the voltage becomes substantially constant at approximately 4 V, irrespective of capacity. This flat portion of constant voltage corresponds to the steep rise and fall in the solid line centered around 4 V of Example 1, thus indicative of the fact that Cl⁻ oxidation is occurring during charging and $Cl_2$ reduction is occurring during discharging. The linear potential gradient which is observed from 3 to 4 V corresponds to the creation and disappearance of an electrical double layer capacitance in acetylene black.

Example 3

It was confirmed that, even when an ionic liquid other than diethylmethyl-2-methoxyethylammonium.tetrafluoroborate (abbreviated as $DEME.BF_4$) was used as the solvent of the nonaqueous electrolyte solution, oxidation of chlorine ions (Cl⁻) and reduction of the generated chlorine ($Cl_2$) would occur at the LiCl-containing positive electrode. The working electrode, reference electrode, and negative electrode were produced similarly to Example 2.

The nonaqueous electrolyte solution was prepared by mixing lithium bis(trifluoromethanesulfonyl)imide $(CF_3SO_2)_2NLi$, manufactured by Kishida Chemical Col., Ltd., abbreviated as LiTFSI) and diethylmethyl-2-methoxyethylammonium.bis(trifluoromethanesulfonyl)imide $((C_2H_5)_2$ $(CH_3)(CH_3OCH_2CH_2)N.(CF_3SO_2)_2N$, manufactured by Kanto chemical co., inc., abbreviated as DEME.TFSI) to a molar ratio of LiTFSI/DEME.TFSI=1/10, followed by agitation.

The three electrodes were immersed in a LiTFSI/DEME.TFSI=1/10 solution, and subjected to cyclic voltammetry. The measurement conditions were: a sweep rate of 1 mV/sec; a sweep range of 1.7 to 4.2 V; and 4 cycles.

Figure 3:
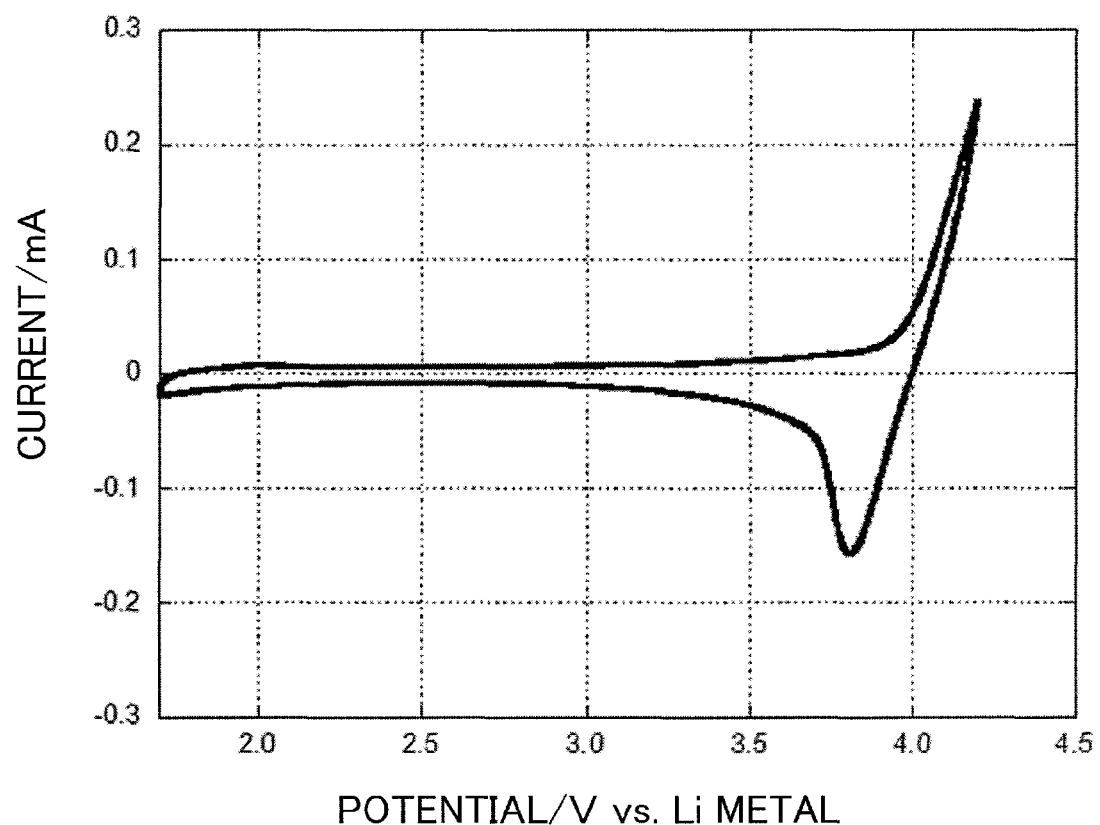
FIG. 3 is a diagram showing potential-current changes when an electrode containing LiCl was subjected to cyclic voltammetry in an LiTFSI/DEME.TFSI solution.

FIG. 3 shows a waveform of the 4th cycle in this case. In FIG. 3, a sharp rise of oxidation current from approximately 4 V and a corresponding reduction wave are observed. It can be seen that oxidation of Cl⁻ and reduction of the generated $Cl_2$ are occurring on the working electrode.

Example 4

A positive electrode containing magnesium chloride ($MgCl_2$) was produced, and similarly to the positive electrode containing lithium chloride (LiCl), it was confirmed that oxidation and reduction of Cl⁻ would occur.

$MgCl_2$ (manufactured by Aldrich), acetylene black (abbreviated as AB), and polytetrafluoroethylene (abbreviated as PTFE) were mixed to a weight ratio of $MgCl_2$/AB/PTFE=50/40/10 and kneaded, followed by rolling, whereby a positive electrode sheet was obtained. A disk with a diameter of 2 mm was punched out of this positive electrode sheet, which was press-fitted on a platinum mesh with 100 meshes, thereby producing a positive electrode.

A reference electrode was produced by inserting what was obtained by press-fitting a lithium foil onto a nickel wire (manufactured by The Nilaco Corporation), into a glass tube having porous glass provided on its tip end. The glass tube was filled with a solution prepared from lithium tetrafluoroborate ($LiBF_4$) and diethylmethyl-2-methoxyethylammonium.tetrafluoroborate (abbreviated as $DEME.BF_4$) at a molar ratio of $LiBF_4/DEME.BF_4=1/10$.

As a counter electrode, a rolled sheet of a mixture of polytetrafluoroethylene and acetylene black was produced similarly to Example 1, which was made into a strip with a width of 10 mm.

The nonaqueous electrolyte solution was prepared by mixing magnesium chloride ($MgCl_2$) and diethylmethyl-2-methoxyethylammonium.tetrafluoroborate (abbreviated as $DEME.BF_4$) to a molar ratio of $MgCl_2/DEME.BF_4=1/10$, followed by agitation.

The three electrodes were immersed in a $MgCl_2$/DEME.$BF_4$=1/10 solution, and subjected to cyclic voltammetry. The measurement conditions were: a sweep rate of 1 mV/sec; a sweep range of 2.8 to 4.4 V; and 4 cycles.

Figure 4:
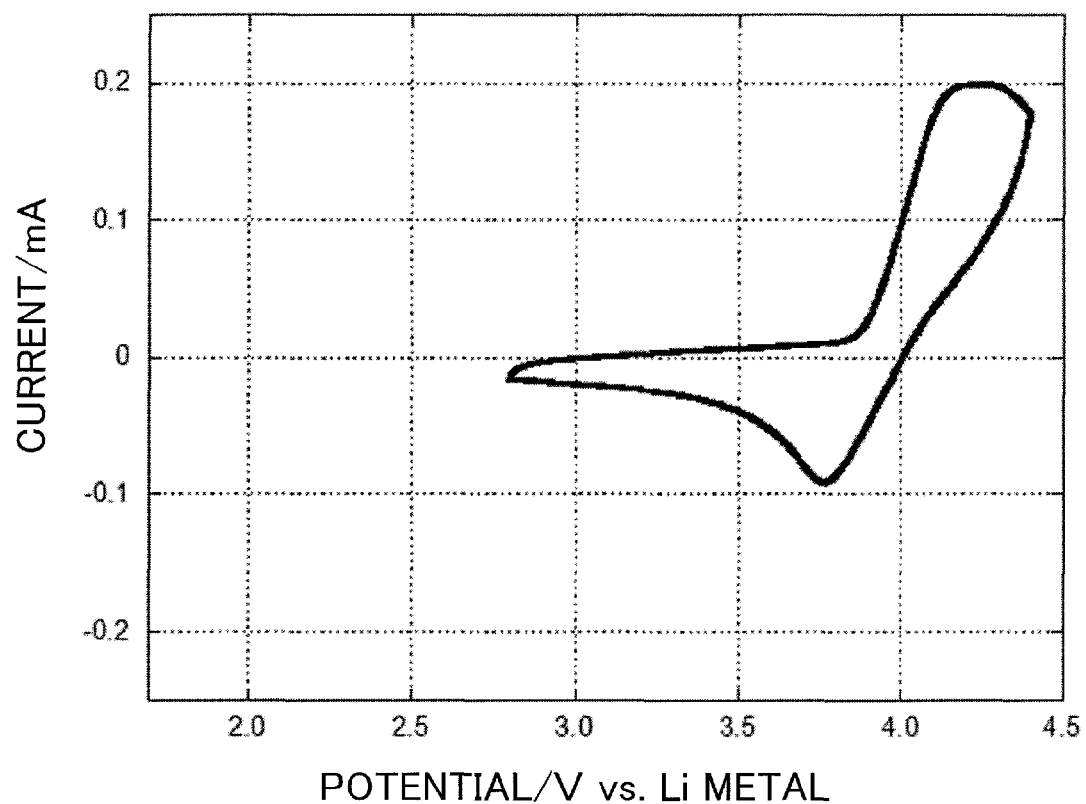
FIG. 4 is a diagram showing potential-current changes when an electrode containing MgCl$_2$ was subjected to cyclic voltammetry in an MgCl$_2$/DEME.BF$_4$ solution.

FIG. 4 shows a waveform of the 4th cycle in this case. In FIG. 4, a sharp rise of oxidation current from approximately 4 V and a corresponding reduction wave are observed. It can be seen that, also when $MgCl_2$ is used, oxidation of Cl⁻ and reduction of the generated $Cl_2$ are occurring on the working electrode.

Example 5

A positive electrode containing tetrabutylammonium chloride ($(C_4H_9)_4NCl$, abbreviated as TBAC) was produced, and it was confirmed that oxidation of chlorine ions (Cl⁻) and reduction of the generated chlorine ($Cl_2$) would occur at the positive electrode.

TBAC (manufactured by Aldrich), acetylene black (abbreviated as AB), and polytetrafluoroethylene (abbreviated as PTFE) were mixed to a weight ratio of TBAC/AB/PTFE=50/40/10 and kneaded, followed by rolling, whereby a positive electrode sheet was obtained. A disk with a diameter of 2 mm was punched out of this positive electrode sheet, which was press-fitted on a platinum mesh with 100 meshes, thereby producing a positive electrode.

A reference electrode was produced by inserting what was obtained by press-fitting a lithium foil onto a nickel wire (manufactured by The Nilaco Corporation), into a glass tube having porous glass provided on its tip end. The glass tube was filled with a solution prepared from lithium tetrafluoroborate ($LiBF_4$) and diethylmethyl-2-methoxyethylammonium.tetrafluoroborate (abbreviated as $DEME.BF_4$) at a molar ratio of $LiBF_4/DEME.BF_4=1/10$.

As a counter electrode, a rolled sheet of a mixture of polytetrafluoroethylene and acetylene black was produced similarly to Example 1, which was made into a strip with a width of 10 mm.

$DEME.BF_4$ was used for the nonaqueous electrolyte solution.

The three electrodes were immersed in a $DEME.BF_4$ solution, and subjected to cyclic voltammetry. The measurement conditions were: a sweep rate of 1 mV/sec; a sweep range of 2.8 to 4.4 V; and 4 cycles.

Figure 5:
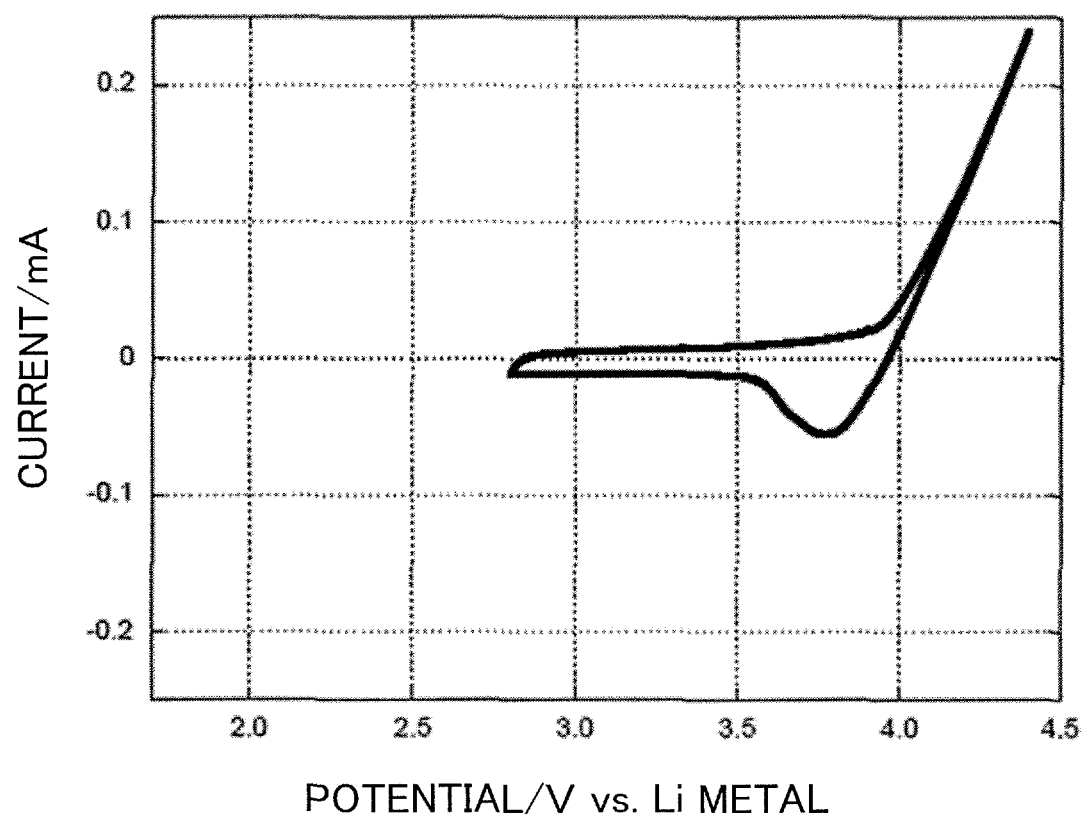
FIG. 5 is a diagram showing potential-current changes when, in a DEME.BF$_4$ solution, an electrode containing $(C_4H_9)_4NCl$ was subjected to cyclic voltammetry.

FIG. 5 shows a waveform of the 4th cycle in this case. In FIG. 5, a sharp rise of oxidation current from approximately 4 V and a corresponding reduction wave are observed. It can be seen that, also when TBAC is used, oxidation of Cl⁻ and reduction of the generated $Cl_2$ are occurring on the working electrode.

Example 6

As a carbon material to be mixed with lithium chloride (manufactured by LiCl, Aldrich), other than acetylene black (abbreviated as AB) used for Example 2, three kinds of carbon materials were studied, and the respective relative discharge capacities over the case of using AB were examined. The carbon materials studied other than AB were: mesoporous carbon manufactured by Aldrich (product #: 699624, specific surface area: 70 m$^2$/g); mesoporous carbon manufactured by Aldrich (product #: 699632, specific surface area: 200 m$^2$/g); and activated carbon manufactured by KURARAY CHEMICAL CO., LTD. (product #: RP-20, specific surface area: 2000 m$^2$/g).

LiCl, each carbon material, and polytetrafluoroethylene (abbreviated as PTFE) were mixed to a weight ratio of LiCl/carbon material/PTFE=70/20/10 and kneaded, followed by rolling, whereby a positive electrode sheet was obtained. A disk with a diameter of 2 mm was punched out of this positive electrode sheet, which was press-fitted on a platinum mesh with 100 meshes (manufactured by The Nilaco Corporation), thereby producing a positive electrode.

A reference electrode and a counter electrode were both produced by using a nickel mesh as a current collector, and attaching a lithium foil thereto.

The nonaqueous electrolyte solution was prepared by mixing lithium tetrafluoroborate (LiBF$_4$) and diethylmethyl-2-methoxyethylammonium.tetrafluoroborate (abbreviated as DEME.BF$_4$) to a molar ratio of LiBF$_4$/DEME.BF$_4$=1/10, followed by agitation.

The four electrodes were immersed in an LiBF$_4$/DEME.BF$_4$=1/10 solution, and the working electrode potential was maintained at 4.2 V for 20 hours. Then, a reduction current of 5 μA was flowed, and a discharge capacity was defined at the point where the working electrode potential reached 3.0 V.

Figure 6:
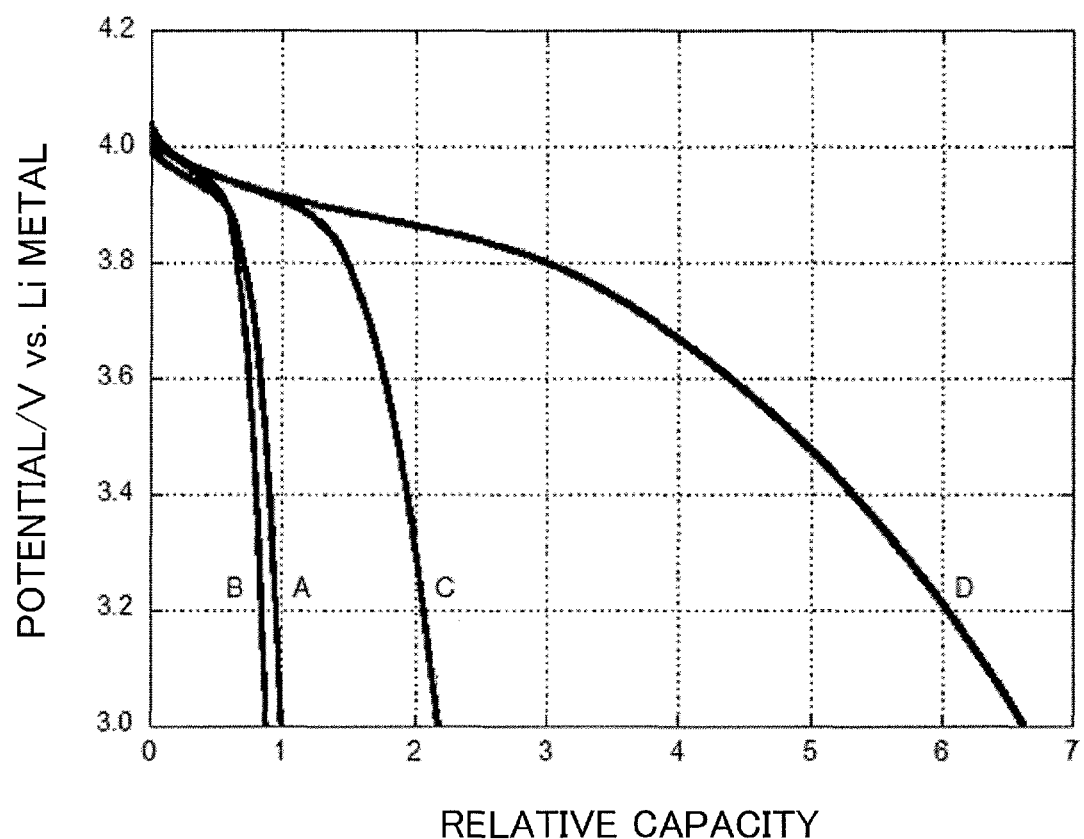
FIG. 6 is a diagram showing, during discharging of electrodes containing LiCl and various carbon materials in an LiBF$_4$/DEME.BF$_4$ solution, a relative ratio between discharge capacities of the respective electrodes.

FIG. 6 shows a discharge curve of each positive electrode, where A: acetylene black, B: 699624, C: 699632, and D: RP-2000, showing data which is plotted against the discharge capacity of acetylene black being 1. In any of the carbon materials, there is a plateau around approximately 4 V, indicative of Cl$_2$ reduction. It can also be seen that the discharge capacity is remarkably increased by using a carbon material with a large specific surface.

The electrochemical energy storing device disclosed herein is useful as a power supply of a smartphone, a mobile phone, a personal digital assistant, a personal computer, a camcorder, a portable game device, or the like. Moreover, it can be used as a power supply for driving a power tool, a vacuum cleaner, a robot, or the like, and also as a power supply for driving or assisting with an electric motor of an electric vehicle, a hybrid electric vehicle, a plug-in hybrid electric vehicle, a fuel cell vehicle, or the like.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An electrochemical energy storing device comprising:
a positive electrode containing a positive-electrode active material;
a negative electrode; and
a nonaqueous electrolyte solution which is in contact with the positive electrode and the negative electrode and contains, as a solvent, an ionic liquid including cations having an alkoxyalkyl group as a component, the ionic liquid being a major component of the solvent, wherein:
in a discharged state, the positive-electrode active material contains at least one selected from the group consisting of (1) an alkali metal chloride, (2) an alkaline-earth metal chloride, and (3) a quaternary alkylammonium chloride,
the ionic liquid of the nonaqueous electrolyte solution dissolves (1) the alkali metal chloride contained in the positive-electrode active material, (2) the alkaline-earth metal chloride contained in the positive-electrode active material, and/or (3) the quaternary alkylammonium chloride contained in the positive-electrode active material, and
the nonaqueous electrolyte solution has (1) an alkali metal ion conductivity in the case where the positive-electrode active material contains the alkali metal chloride, (2) an alkaline-earth metal ion conductivity in the case where the positive-electrode active material contains the alkaline-earth metal chloride, and/or a quaternary alkylammonium ion conductivity in the case where the positive-electrode active material contains the quaternary alkylammonium chloride.

2. The electrochemical energy storing device of claim 1, wherein, in a charged state, the positive electrode has Cl$_2$ adsorbed thereto, the Cl$_2$ having been generated from the alkali metal chloride, alkaline-earth metal chloride, or quaternary alkylammonium chloride.

3. The electrochemical energy storing device of claim 1, wherein the alkali metal chloride is LiCl.

4. The electrochemical energy storing device of claim 1, wherein the alkaline-earth metal chloride is MgCl$_2$.

5. The electrochemical energy storing device of claim 1, wherein the quaternary alkylammonium chloride is (C$_4$H$_9$)$_4$NCl.

6. The electrochemical energy storing device of claim 1, wherein cations in the ionic liquid are (C$_2$H$_5$)$_2$(CH$_3$)(CH$_3$OCH$_2$CH$_2$)N$^+$.

7. The electrochemical energy storing device of claim 1, wherein anions in the ionic liquid are BF$_4^-$.

8. The electrochemical energy storing device of claim 1, wherein anions in the ionic liquid are (CF$_3$SO$_2$)$_2$N$^-$.

9. The electrochemical energy storing device of claim 2, wherein the positive electrode contains a carbon material, and, in the charged state, the chlorine is adsorbed to the carbon material.

10. The electrochemical energy storing device of claim 9, wherein the carbon material is acetylene black.

11. The electrochemical energy storing device of claim 9, wherein the carbon material is activated carbon.

12. The electrochemical energy storing device of claim 1, wherein an amount of the ionic liquid is 50% or more of the nonaqueous electrolyte solution.

13. The electrochemical energy storing device of claim 1, wherein the nonaqueous electrolyte solution further contains an organic solvent other than the ionic liquid, and an content of the is organic solvent is equimolar to or less than the ionic liquid.

14. The electrochemical energy storing device of claim 1, wherein the solvent consists of the ionic liquid.

* * * * *